United States Patent Office 3,795,699
Patented Mar. 5, 1974

3,795,699
PRODUCTION OF UNSATURATED COMPOUNDS
Donald Wright and Samuel Gardner, Stockton-on-Tees, England, assignors to Imperial Chemical Industries Limited, London, England
No Drawing. Filed Jan. 3, 1972, Ser. No. 215,184
Claims priority, application Great Britain, Jan. 12, 1971, 1,480/71
Int. Cl. C07c 69/14, 69/82
U.S. Cl. 260—475 N        6 Claims

ABSTRACT OF THE DISCLOSURE

Unsaturated esters are produced by reacting an acyclic conjugated diolefine such as butadiene with a carboxylic acid, particularly orthophthalic acid, in the presence of a platinum or iridium compound and carbon monoxide or a metal carbonyl. The esters produced are oligomers of butadiene, the carbon monoxide giving enhanced catalyst stability and life.

---

The present invention relates to the production of unsaturated esters.

According to the invention a process for the production of unsaturated esters containing one or more groups

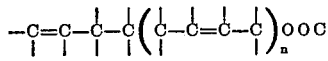

comprises reacting an acyclic conjugated diolefine with a carboxylic acid in the presence of a platinum or iridium compound and carbon monoxide or a carbonyl.

In the formula

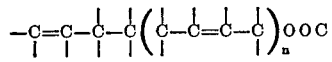

$n$ is a whole number and is preferably 1 or 2.

The acyclic conjugated diolefine which is used in the process comprises the basic structure

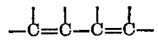

in which the residual valencies may be satisfied by inorganic groups such as halogen or by organic groups or by hydrogen. Preferably the residual valencies are satisfied by alkyl groups particularly lower alkyl groups such as methyl groups or by hydrogen. Thus butadiene, isoprene or piperylene may be used in the process, butadiene being particularly preferred.

The carboxylic acid may be an aliphatic or aromatic mono- or di-carboxylic acid. Examples of monocarboxylic acids are benzoic acid, toluic acid and alkanoic acids, particularly lower alkanoic acids containing up to 6 carbon atoms, such as acetic acid. Dibasic acids which may be used include dibasic alkanoic acids such as adipic acid and dibasic aromatic acids, particularly the three phthalic acids. With dibasic acids, one or both of the carboxyl groups may react with the acyclic conjugated diolefine, thereby giving rise to products containing one or two of the groups

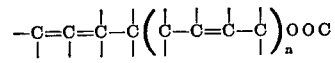

The unsaturated product of the process is derived from a dimer or lower polymer of the acyclic conjugated diolefine

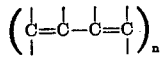

and from the carboxyl group. The di-esters, in which $n=1$ derived from the dibasic acids, e.g. from ortho-phthalic acid, may after hydrogenation of the olefinically unsaturated bonds be used as plasticizer esters. Thus the di-ester derived from ortho-phthalic acid and butadiene yields, after hydrogenation, di-n-octyl-orthophthalate.

Compounds of platinum or iridium may be used in the process and of these platinum is preferred. Suitable compounds of platinum or iridium include the halides, e.g. the chloride such as platinic chloride, lower alkanoates of acids containing up to 6 carbon atoms, e.g. the acetate, organo-complexes of the metals such as the acetylacetonate and complexes with ligands such as the alkyl or aryl phosphines, particularly triphenyl phosphine, e.g. tetrakis(tri-phenyl phosphine) platinum. The concentration of the platinum or iridium compound in the reaction solution may be $10^{-7}$ to 1.0 molar, preferably $10^{-6}$ to 1.0 molar, more preferably $10^{-4}$ to $10^{-2}$ molar.

The reaction may be carried out in the presence of carbon monoxide, i.e. by passing carbon monoxide into the reaction solution or by carrying out the reaction in a sealed system under an atmosphere comprising carbon monoxide. The carbon monoxide partial pressure may be up to 20 atmospheres, preferably up to 10 atmospheres and is more preferably in the range 0.1 to 5 atmospheres. Alternatively a carbonyl, preferably a metal carbonyl, may be present in the reaction medium, e.g. a transition metal carbonyl, particularly a Group VIII metal carbonyl such as iron carbonyl, cobalt carbonyl or a noble metal carbonyl. The concentration of such a carbonyl in the reaction medium may lie in the range $10^{-4}$ to 1.0 M. Furthermore a metal carbonyl and carbon monoxide may be used together, preferably, however, carbon monoxide alone is used. We have found that the benefits conferred by the use of carbon monoxide or a metal carbonyl include improved catalyst stability and a reduction in the tendency of the product to isomerize to more highly branched chain isomers.

The process may be carried out in an inert solvent, e.g. an aromatic hydrocarbon such as benzene or toluene or a paraffin such as hexane or a cycloparaffin such as cyclohexane. Polar solvents such as acetone, dimethylformamide, dimethylacetamide or tetrahydrofuran may also be used. The temperature under which the process may be carried out preferably lies in the range ambient to 300° C., more preferably 50 to 150° C. In the absence of carbon monoxide the pressure is usually the autogenous pressure of the reactants at the temperature of the reaction.

The invention will now be further described with reference to the following examples.

EXAMPLE 1

8.3 grams ortho-phthalic acid (0.05 mole), 50 mls. butadiene (0.63 mole), 3.2 milligrams platinum acetylacetonate ($8 \times 10^{-6}$ moles) and 20 mls. benzene were heated in an autoclave under 5 atmospheres pressure of carbon monoxide at a temperature of 80° C. for ten hours. At the end of the reaction unchanged phthalic acid (0.5 gram) was filtered off and the solvent evaporated to yield di-octa-2,7-dienyl-orthophthalate (17.5 grams), i.e. 5,700 molecules of ester per atom of platinum catalyst.

EXAMPLE 2

20 mls. acetic acid (0.35 mole), 50 mls. butadiene (0.63 mole) and 13.5 milligrams platinum acetylacetonate ($3 \times 10^{-5}$ moles) were heated in an autoclave under 5 atmospheres carbon monoxide at a temperature of 80° C. for 10 hours. At the end of the reaction the mixture was distilled at 96° C./16 mm. to yield 28.4 grams of octa-2,7-dienyl acetate, i.e. 5,600 moles ester per atom of platinum. The proportion of the isomeric octa-1,7-dienyl 3-acetate in the product was only about 2%, while in the absence of the carbon monoxide as much as 30% of this less desirable isomer is obtained.

EXAMPLE 3

8.3 grams ortho-phthalic acid (0.05 mole), 50 mls. butadiene (0.63 mole), 3.9 milligrams platinum acetylacetonate ($1 \times 10^{-5}$ moles), 0.12 gram chromium hexacarbonyl ($5.4 \times 10^{-4}$ moles) and 20 mls. benzene were heated in an autoclave at 80° C. for 10 hours. At the end of the reaction excess phthalic acid (0.5 gram) was filtered off and the solvent evaporated to give a residue of pure diocta-2,7-dienyl-orthophthalate.

EXAMPLE 4

7.3 grams of orthophthalic acid (0.044 mole), 30 grams of an isobutene/butadiene mixture (containing 0.22 mole of butadiene), 0.054 gram of iridium acetylacetonate ($1.4 \times 10^{-4}$ moles) and 20 mls. of benzene were heated in an autoclave at 120° C. for 10 hours under 5 atmospheres pressure of carbon monoxide. At the end of the reaction the unchanged phthalic acid was filtered off and the solvent evaporated to yield 0.8 gram of diocta-2,7-dienyl orthophthalate.

EXAMPLE 5

8.3 grams of orthophthalic acid (0.05 mole), 17 grams of butadiene (0.31 mole), 0.016 gram of platinous acetate ($5 \times 10^{-5}$ mole) and 20 mls. of benzene were heated in an autoclave under 5 ats. carbon monoxide at 120° C. for 10 hours. Unchanged phthalic acid was filtered off and the solvent evaporated to yield 2.5 grams of phthalate ester of which 0.85 gram was octa-2,7-dienyl hydrogen orthophthalate, the balance being the diester.

EXAMPLE 6

7.3 grams of orthophthalic acid (0.044 mole), 31 grams of an isobutene/butadiene mixture (containing 0.23 mole butadiene), 0.100 gram ($2.5 \times 10^{-4}$ moles) platinum acetylacetonate and 20 mls. cyclohexane were heated in an autoclave under 5 ats. pressure of carbon monoxide at 100° C. for 20 hours. The ester was recovered as described in the foregoing examples, the yield being 3.2 grams of diocta-2,7-dienyl orthophthalate.

EXAMPLE 7

24.9 grams of orthophthalic acid (0.15 mole), 48.6 grams of butadiene (0.88 mole) and 0.300 gram of platinum acetylacetonate ($7.5 \times 10^{-4}$ moles) were heated in an autoclave in the absence of a solvent under 5 ats. carbon monoxide at 100° C. for 10 hours. 55 grams of ester product were obtained of which 0.9 gram was the monoester, the balance being the diester.

EXAMPLE 8

7.3 grams of orthophthalic acid (0.044 mole), 28 grams of an isobutene/butadiene mixture (containing 0.17 mole butadiene), 0.020 gram platinum acetyl acetonate and 20 mls. of tetrahydrofuran were heated in an autoclave under 5 ats. carbon monoxide at 120° C. for 3 hours. Excess phthalic acid was filtered off and the solvent evaporated to give 11.4 grams of octa-2,7-dienyl phthalates of which 3.5 grams were the monoester.

EXAMPLE 9

7.3 grams of adipic acid (0.05 mole), 50 mls. of butadiene (0.63 mole), 0.016 gram platinum acetyl acetonate ($4 \times 10^{-5}$ mole) and 20 mls. of benzene were heated in an autoclave under 5 ats. carbon monoxide at 100° C. for 3 hours. The mixture was filtered free from unchanged adipic acid (0.65 gram) and evaporation of the solvent gave a mixture of mono- and di-octa-2,7-dienyladipate.

EXAMPLE 10

7.3 grams of orthophthalic acid (0.044 mole), 30.6 grams of an isobutene/butadiene mixture (containing 0.23 mole butadiene), 0.020 gram platinous chloride ($7.5 \times 10^{-5}$ mole) and 20 mls. benzene were heated in an autoclave under 5 ats. carbon monoxide at 120° C. for 10 hours. After filtering off the excess phthalic acid and evaporating the solvent, 9.3 grams of an ester were obtained which comprised 19 millimoles of diocta-2,7-dienyl orthophthalate and 8 millimoles octa-2,7-dienyl hydrogen orthophthalate.

A repeat of the experiment in the absence of carbon monoxide gave only 0.1 gram of ester.

EXAMPLE 11

12 grams of formic acid (0.26 mole), 50 mls. of butadiene (0.63 mole), 0.009 gram platinum acetyl acetonate and 20 mls. benzene were heated in an autoclave under 5 ats. carbon monoxide at 80° C. for 10 hours. On completion of the reaction a titration established that 70% of the formic acid had been consumed. Distillation of the oil yielded 19.6 grams of octa-2,7-dienyl formate (B.P. 95°–97° at 20 mm.), i.e., 70% yield on the formic acid consumed.

EXAMPLE 12

7.3 grams of phthalic acid (0.044 mole), 12 grams of butadiene (0.22 mole), 0.020 gram of platinum acetylacetonate, 0.05 gram of cupric acetate ($2.7 \times 10^{-4}$ mole) and 20 mls. benzene were heated in an autoclave under 5 ats. of carbon monoxide at 150° C. for one hour. All the phthalic acid was consumed and the yield of ester was 15.7 grams, 1.6 grams of which were the octa-2,7-dienyl orthophthalate.

What is claimed is:

1. A process for the production of unsaturated esters containing one or more groups

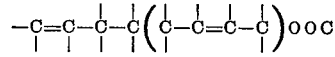

which comprises reacting butadiene with an aliphatic or aromatic mono- or di-carboxylic acid in the presence of a halide, a lower alkanoate of an acid containing up to 6 carbon atoms or an organo-complex of platinum or iridium and carbon monoxide or a Group VIII metal carbonyl.

2. The process of claim 1 in which the carboxylic acid is benzoic acid, a toluic acid, a lower alkanoic acid containing up to 6 carbon atoms, adipic acid or one of the three phthalic acids.

3. The process of claim 1 in which the partial pressure of the carbon monoxide is up to 20 atmospheres.

4. The process of claim 1 in which an inert solvent is present.

5. The process of claim 4 in which the inert solvent is an aromatic hydrocarbon, a paraffin, a cycloparaffin or a polar solvent.

6. The process of claim 1 in which an octadienyl ester is produced by reacting butadiene with adipic acid, orthophthalic acid or acetic acid at 50° to 200° C. in the presence of a $10^{-7}$ to 1.0 molar concentration of a platinum halide, a platinum acetylacetonate or a platinum alkanoate of an acid containing up to 6 carbon atoms and in the presence of up to 10 atmospheres partial pressure of carbon monoxide.

References Cited

UNITED STATES PATENTS

| | | | |
|---|---|---|---|
| 3,534,088 | 10/1970 | Bryant et al. | 260—475 N |
| 3,562,314 | 2/1971 | Shryne | 260—475 N |
| 3,407,224 | 10/1968 | Smutney | 260—475 N |

FOREIGN PATENTS

| | | | |
|---|---|---|---|
| 1,224,595 | 3/1971 | Great Britain | 260—475 N |

LORRAINE A. WEINBERGER, Primary Examiner
E. J. SKELLY, Assistant Examiner

U.S. Cl. X.R.

260—410.9 N, 476 R, 485 N, 497 A